UNITED STATES PATENT OFFICE.

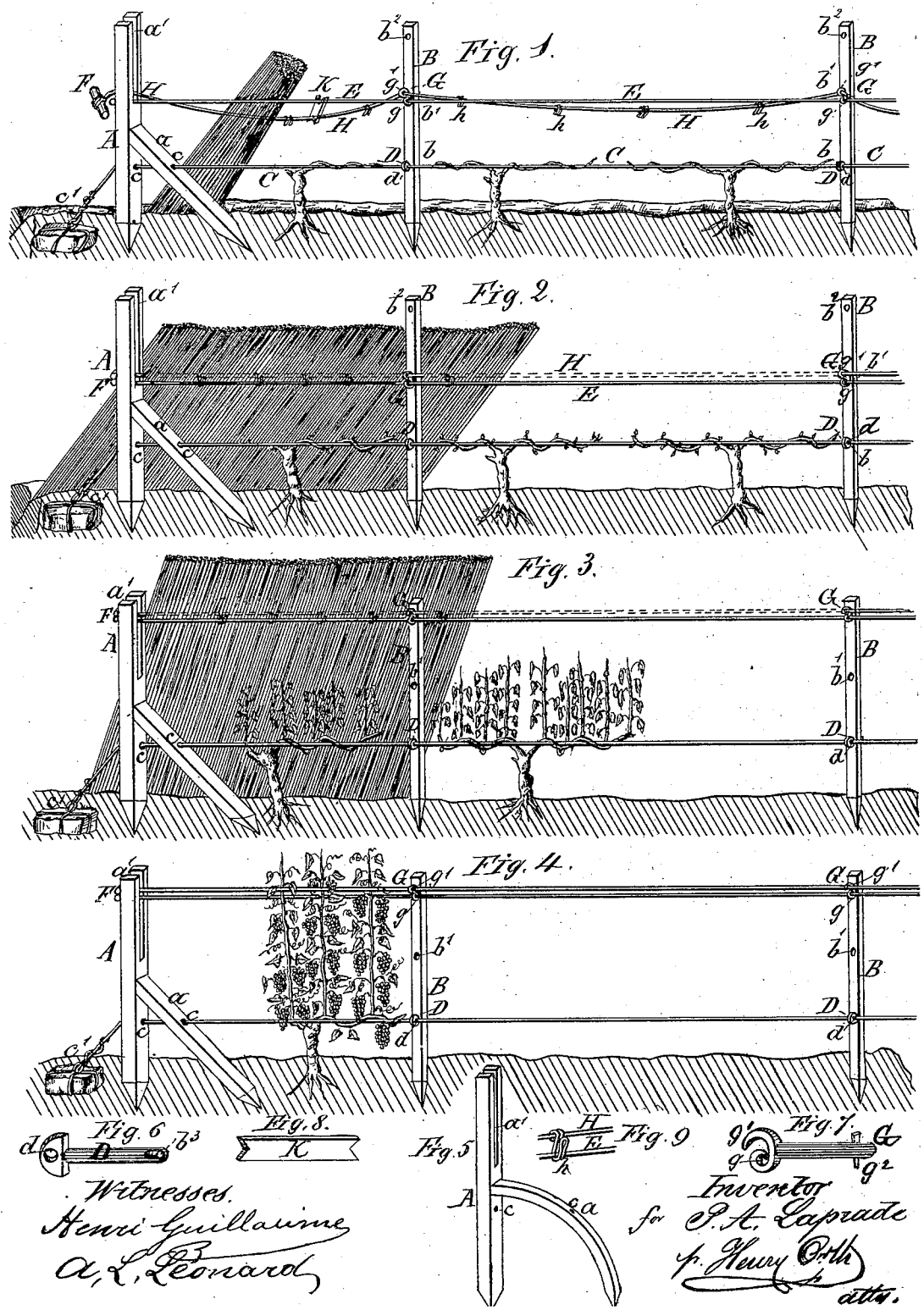

PIERRE A. LAPRADE, OF ISSOUDUN, FRANCE.

IMPROVEMENT IN COMBINED ESPALIER AND SHELTER FOR VINES.

Specification forming part of Letters Patent No. 193,969, dated August 7, 1877; application filed December 4, 1875.

*To all whom it may concern:*

Be it known that I, PIERRE ALEXANDRE LAPRADE, of the city of Issoudun, in the Department of the Indre and Republic of France, have invented certain new and useful Improvements in Combined Espalier and Shelter especially adapted for Vines, of which the following is a specification:

My invention has for its object the construction of espaliers or trellis-work for vines in such a manner as to be readily employed for or converted into temporary protection or shelter in the early part of the spring, to prevent the frosts from injuring or destroying the buds or sprouts, as well as to promote their growth.

This espalier or trellis-work is especially adapted to vineyards, though it may be employed in gardens or otherwise with great advantage and benefit.

Various means have been suggested and tried to protect vines from the oft-occurring spring-frosts, such as the surrounding of the stock with a cone of straw, which not only requires time, but is especially objectionable on account of its depriving the vine of its required supply of atmospheric air, as well as the rays or warmth of the sun, so necessary to its development. Straw matting has also been employed, but, owing to the cost of such when employed to shelter whole vineyards, had to be abandoned, and both means referred to are further objectionable as it is an impossibility to fumigate the vines when closed in either by loose straw or straw matting.

I am also aware that various kinds of shelters for temporary use have heretofore been employed, such as tent-cloth in conjunction with wall-culture, and inclined thatch in conjunction with trellis-culture, and various other kinds; but none of them have been constructed and arranged, so far as I know, to adjust them to the early or first growth of the vines so long as a shelter is desirable for them.

My invention consists in overcoming these difficulties, and producing a shelter simple and economical in construction, requiring but little time, comparatively, to put up, and which may be easily removed when not required any longer, the stationary or permanent portion of which shall constitute the espalier or trellis-frame itself for the vines.

In the accompanying drawings, Figures 1, 2, 3, and 4 are perspective views of my improved espalier or trellis-work, showing the same when used as such, or as a shelter or protection, and Figs. 5, 6, 7, 8, and 9 are detail views of parts of the same.

A A are the end posts, made of wood or metal, (both being illustrated by the drawings,) having a brace-piece, $a$, and their upper portions slotted at $a'$, their lower ends being pointed, so as to easily drive them in the ground. B B are the stakes or palings, having their lower ends pointed also, and are provided with a series of holes, $b\ b^1\ b^2$, at certain distances from each other, for the purpose hereinafter more fully described. C is the lower or ground wire, which passes through the posts A at $c$, and is anchored in the ground beyond said post at $c'$. This wire is a sufficient distance from the ground to be on a level with the top of the stock of the vine, or nearly so, when said stock is clipped or trimmed, and is passed through the eye $d$ of a series of bolts, D, which are inserted into the lower holes $b$ of the stakes or palings B, after they have been driven into the ground at a distance of five or six yards, more or less, from each other, these bolts being held in position by means of pins $b^3$ passing through said bolts on the opposite side of the stake, one bolt being required for each stake, and, when at the end of the row, the wire is passed through the opposite end post A and stretched tight by means of an anchorage, as shown by Figs. 1, 2, 3, and 4.

E is one of the upper wires, both ends of which are affixed to short iron rods F, which, when the wire is placed in position, rest transversely across the slot $a'$, at the back or rear face of the posts A, the wires passing through said slots. Before attaching the second end of the wire E to the rod F it is slipped through the eye $g$ of a bolt, G, of peculiar construction, as shown by Fig. 6, one of these bolts to each paling B. The bolts G are provided near the eye, as close as possible thereto, with a hook, $g^1$, which, when the bolt is secured to the stake, projects downward, for a purpose hereinafter described, said bolt being, like the bolt D, held in position, when inserted in the stake, by a pin, $g^2$. The wire E is stretched in the desired position along the slot $a'$ by means of any convenient or preferred stretcher.

H is the upper wire, arranged substantially like the wire E, to short iron bars resting on the outside of the posts A, transversely across the slot $a'$, and are further provided with a series of pendent hooks, $h$, from twelve to fifteen inches apart, which serve to hook the two wires together, as hereinafter more fully explained, said wire H being further secured by hooking it in the downwardly-projecting hooks $g^1$ of the bolts G, and is stretched, like wire E, by any convenient or preferred stretching device. These two wires E H are located in close proximity to each other, and are adjustable vertically along the end posts A and palings B by means of the slots $a'$ and bolts G, and bolt-holes $b^1$ $b^2$.

It will be readily understood that, instead of using one wire below the top wires, more may be employed, if required, but for what is called low vines two rows of wires will be sufficient.

The devices and parts above described constitute the espalier or trellis-frame for the vines, and when it is required to protect them from the frost, (which should be done immediately after the trimming or cutting, and before the budding has commenced,) the operation is as follows, assuming the frames having been used as espalier or trellis, as shown by Fig. 4:

The upper wires E H are slackened and bolts G withdrawn from the palings B; the wires are then lowered to within about two feet of the ground-wire C, and the bolts G inserted into the holes $b'$. The wire E is then stretched, while the wire H above it remains loose. Straw is then taken up by the armful, and the cut or butt end inserted between the two wires held apart by means of a separator, K, Fig. 8, formed of a flat piece of wood about a foot in length, and forked at both ends to receive the wires, as shown by Fig. 1. The straw is then spread out in a thin layer, the separator withdrawn, and the wires E H are hooked together as fast as the straw is spread by means of the hooks $h$. The straw should project sufficiently through the wires, so that when it becomes necessary to raise or elevate the shelter it may enable the wires to be slipped along it without falling out. The ear end of the straw is laid at an angle to the wires in a ditch or furrow previously dug or plowed for the purpose, the earth being thrown back over the straw when formed into a thatch. At each stake B the wire H is hooked in the hook $g^1$ of the bolt G, and when a row is completed the wire H is stretched tight, thus forming a solid and effectual protection against frost.

After the vines have put forth their shoots sufficiently long to reach the thatch of straw, which they should never be allowed to touch, the shelter is raised by slightly loosening the wires E H, and then withdrawing the bolts G, and slipping the wires upward along the slots in the posts A until said wires are on a level with the holes $b^2$ in the palings B, when the bolts G are inserted and secured in said holes, and the wires tightened, thereby elevating the shelter about two feet, more or less, above the holes $b^1$, when the vines are again allowed to grow until the shoots reach to near the thatch, at which time the season is so far advanced as to render the same useless, and the shelter is then removed by unhooking the wires E H from each other and from the bolts G, the straw being slipped from between said wires and carried off for use as litter, being then as good for the purpose as when first inserted.

When the shoots have attained a sufficient height, they are passed between the wires E H, as shown by Fig. 4, by which they are held in a vertical position, and along which they are trained, and form a substantial support or trellis-work.

After harvest all the bolts may be removed from the stakes B, and left suspended from the wires, and the stakes taken up and placed under shelter during winter, to be used again in spring and summer for the purposes stated.

By this arrangement and construction an espalier or trellis-frame for vines may be erected, at a comparatively small cost, which is not only durable, but will, at the same time, afford a means for protecting the vines from spring-frosts without depriving them of air and sunshine, thereby promoting their growth and health, and increasing the quantity and quality of the fruit.

It will be understood that although this kind of trellis and thatch or shelter is particularly applicable to vineyards, I do not wish to limit myself exclusively to this use, as it may be advantageously employed for other plants or trees.

By preference, I employ galvanized wires, and, if desired, the two wires E H may be joined to one stretcher, as there will always be sufficient room for inserting the straw or vines when used as a support or espalier for the latter, or as a protection.

Having described my invention, what I claim, and desire to secure by Letters Patent, is—

1. In an espalier or trellis-frame, the combination of the end posts A and palings B with the removable eyebolts D and the permanently-anchored wire C, all constructed and arranged substantially as described, for the purpose specified.

2. The end posts A, having slots $a'$, in combination with the movable wire E, bolts G, having eyes $g$, and hooks $g^1$, the palings B, and a stretching device, substantially as and for the purposes set forth.

3. The end posts A in combination with the movable wire H, having hooks $h$, the hooks $g^1$ of the bolts G, and the palings B, arranged and constructed substantially as and for the purposes specified.

4. The combination of the movable wire H, having hooks $h$, with the movable wire E, the slotted end posts A, and a series of palings, B, and a stretching device or devices, substantially as and for the purposes specified.

5. A combined adjustable shelter or protection and andjustable espalier or trellis work, consisting essentially of slotted end posts A, the anchored wire C, the wire E, the wire H, provided with a series of metallic hooks, $h$, the palings B, eyebolts D, the hook and eyebolts G, and a stretching device or devices, all combined, constructed, and arranged to operate substantially as and for the purposes described.

In witness that I claim the foregoing I have hereunto set my hand this 12th day of March, 1875.

P. A. LAPRADE.

Witnesses:
ROBT. M. HOOPER,
JEAN BAPTISTE GIRARD.